United States Patent
Agarwal et al.

(10) Patent No.: US 6,738,782 B2
(45) Date of Patent: May 18, 2004

(54) METHOD AND MECHANISM FOR EXTENDING NATIVE OPTIMIZATION IN A DATABASE SYSTEM

(75) Inventors: Nipun Agarwal, San Mateo, CA (US); Dinesh Das, Redwood City, CA (US); Viswanathan Krishnamurthy, Fremont, CA (US); Ravi Murthy, Foster City, CA (US); Anil Nori, San Jose, CA (US); Jagannathan Srinivasan, New Hampshire, CT (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/096,008

(22) Filed: Mar. 11, 2002

(65) Prior Publication Data

US 2003/0009446 A1 Jan. 9, 2003

Related U.S. Application Data

(63) Continuation of application No. 09/272,691, filed on Mar. 18, 1999, now Pat. No. 6,370,522.

(51) Int. Cl.$^7$ ............................................. G06F 17/30
(52) U.S. Cl. ............................................ 707/102; 707/3
(58) Field of Search ............................... 707/102, 2, 3, 707/10, 104.1, 1

(56) References Cited

U.S. PATENT DOCUMENTS

| 5,544,355 A | 8/1996 | Chaudhuri et al. ............. 707/1 |
| 5,551,029 A | 8/1996 | Jagadish et al. ................. 707/1 |
| 5,608,904 A | 3/1997 | Chaudhuri et al. ............. 707/2 |
| 5,671,403 A | 9/1997 | Shekita et al. .................. 707/3 |
| 5,754,841 A | 5/1998 | Carino, Jr. ..................... 707/3 |
| 5,924,094 A * | 7/1999 | Sutter ........................... 707/10 |
| 5,930,785 A | 7/1999 | Lohman et al. ................. 707/2 |
| 6,009,265 A | 12/1999 | Huang et al. ................... 707/1 |
| 6,012,054 A * | 1/2000 | Seputis .......................... 707/3 |
| 6,026,391 A | 2/2000 | Osborn et al. .................. 707/2 |
| 6,195,653 B1 | 2/2001 | Bleizeffer et al. .............. 707/2 |
| 6,275,818 B1 | 8/2001 | Subramanian et al. ......... 707/2 |
| 6,480,836 B1 * | 11/2002 | Colby et al. .................... 707/3 |

OTHER PUBLICATIONS

Mikkilineni, K.; Su, S.; discloses A dynamic interquery optimization method for achieving data sharing among concurrent queries : Distributed Computing Systems in the 1990s, 1988. Proceedings., Workshop on the Future Trends of , Sep. 14–16, 1988.*

Chimenti, D. et al.; "Towards An Open Architecture For LDL"; *Proceedings Of The Fifteenth International Conference On Very Large Data Bases*; pp. 195–203; Amsterdam, Aug. 1989.

Agrawal, R. et al.; "ODS (Object Database and Environment): The Language And the Data Model"; *ACM SIGMOD International Conference On Management Of Data*; vol. 18, No. 2, pp. 36–45; Jun. 1989.

(List continued on next page.)

Primary Examiner—Diane D. Mizrahi
(74) Attorney, Agent, or Firm—Bingham McCutchen LLP

(57) ABSTRACT

A method and system for optimizing the execution of database statement is described. Optimization of database statements having non-boolean predicates is disclosed. Also disclosed is the determination and use of different granularity levels of information for submitting database statement predicates to optimizer-related functions.

49 Claims, 7 Drawing Sheets

OTHER PUBLICATIONS

Finance, Beatrice et al.; "A Rule–Based Query Rewriter In An Extensible DBMS"; *IEEE Comp. Soc. Press*; vol. Conf. 7, 8; pp. 248–256; Apr. 8, 1991.

Derrett, N. et al.; "Rule–Based Query Optimization In IRIS"; *ACM Computer Science Conference*; Feb. 21–23, 1989.

Chaudhuri, Surjit; "An Overview Of Query Optimization In Relational Systems"; *Proceedings Of The AC Sigact–Sigmod–Sigart Symposium On Principles Of Database Systems, New York*; pp. 34–43; Jun. 1, 1998.

Carey, M.J., et al.; "Object–Relational Database Systems: Principles, Products, and Challenges"; SIGMOD 1997, *Proceedings ACM SIGMOD International Conference On Management Of Data*; May 13–15, 1997; Tucson, Arizona; ACM Press 1997; SIGMOD Record 26(2), Jun. 1997; p. 502 and Tutorial Notes.

Stonebraker, M., et al.; "Object–Relational DBMSs—The Next Great Wave"; *Morgan Kaufmann Publishers Inc.,* San Francisco, CA; pp. 121–122; 1996.

Mattos, N.M.; "The KBMS–Prototype Krisys—User Manual"—vol. 1 Overview; Version 2.8, *Computer Science Department*; University of Kaiserslautern, Germany; Dec. 1992.

Jang, Gi–Hwa, et al.; "An Extended Model For Integration Between The Oracle And WWW"; *IEEE Publication, Dept. Of Computer Science*; South Korea; pp. 569–572; vol. 1; Sep. 1997.

Agarawal, N.; "Database Statement Execution Optimizing For Database Query Or Manipulation, Involves Associating Generated Function With Database Object, Calling Database Statement And Function To Compute Cost of Execution Plan"; *Derwent Information Ltd.;* Mar. 1999.

\* cited by examiner

FIG. 5

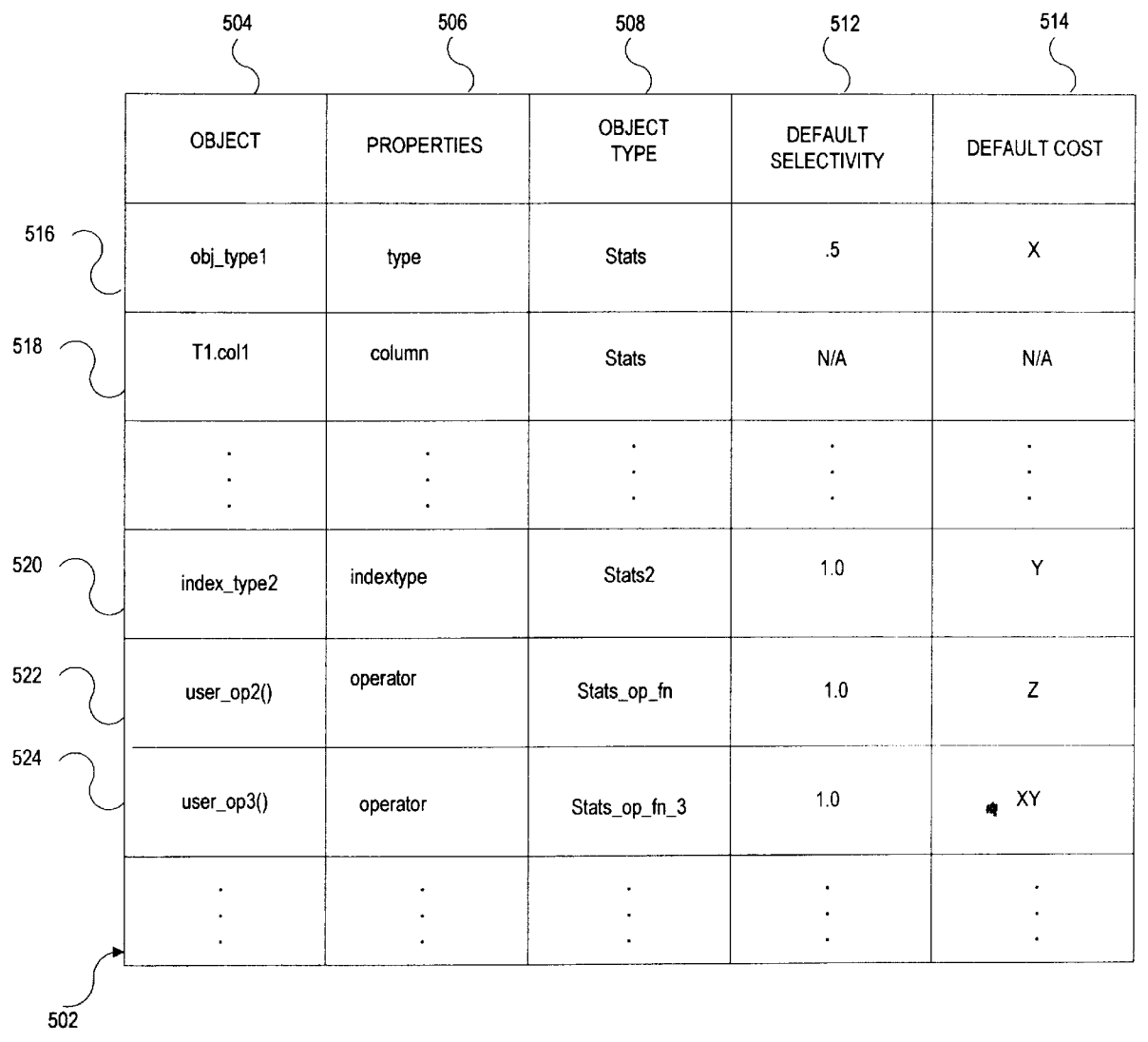

| OBJECT | PROPERTIES | OBJECT TYPE | DEFAULT SELECTIVITY | DEFAULT COST |
|---|---|---|---|---|
| obj_type1 | type | Stats | .5 | X |
| T1.col1 | column | Stats | N/A | N/A |
| ... | ... | ... | ... | ... |
| index_type2 | indextype | Stats2 | 1.0 | Y |
| user_op2() | operator | Stats_op_fn | 1.0 | Z |
| user_op3() | operator | Stats_op_fn_3 | 1.0 | XY |
| ... | ... | ... | ... | ... |

504 — OBJECT
506 — PROPERTIES
508 — OBJECT TYPE
512 — DEFAULT SELECTIVITY
514 — DEFAULT COST
516, 518, 520, 522, 524 — rows
502 — table

METHOD AND MECHANISM FOR EXTENDING NATIVE OPTIMIZATION IN A DATABASE SYSTEM

CROSS-REFERENCE TO RELATED APPLICATIONS

The present application is a continuation of U.S. application Ser. No. 09/272,691, filed on Mar. 18, 1999, and now U.S. Pat. No. 6,370,522 which is hereby incorporated by reference in its entirety.

BACKGROUND OF THE INVENTION

1. Field of the Invention

The present invention relates to optimization in a database system.

2. Background

In a database system, optimization is the process of choosing an efficient way to execute a database query or manipulation action. Examples of such query or manipulation actions include searching, retrieving, modifying, organizing, adding, and/or deleting information from the database. These database query/manipulation actions are normally initiated by submitting commands to a database server in a database query language. One popular database query language is known as the Structured Query Language ("SQL"). For the purposes of explanation only, and not by way of limitation, the following description is made with particular reference to database statements involving SQL.

To execute a database query language statement (e.g., a SQL statement), the database system may have to perform steps involving the retrieval or manipulation of data from various database structures, such as tables and indexes. Often, there exists many alternate ways to execute the SQL statement. For example, a single SQL statement can be executed in different ways by varying the order in which tables and indexes are accessed to execute the statement. The exact combination and order of steps taken to execute the SQL statement can drastically change the efficiency or speed of execution for the statement. The exact combination and order of steps that are used to execute a SQL statement is referred to as an "execution plan."

As an example, consider the following SQL statement, which queries for the name of all employees having a salary equal to 100 from a database table "emp_table":

SELECT employee_name
FROM emp_table
WHERE salary=100

A first execution plan could include the step of performing a full table scan of emp_table to execute the query. This first execution plan would retrieve every row from emp_table to identify particular rows that match the WHERE clause. Alternatively, if an index exists for the "salary" column of emp_table, then a second execution plan could involve accessing the index to identify rows that match the WHERE clause, and thereafter retrieving only those identified rows from the table. The index is considered an alternate "access path" to the data sought by the SQL statement.

Each execution plan has a "cost" that is associated with its execution. The cost of an execution plan can be expressed in terms of the resources that are consumed to execute the SQL statement using that execution plan. For example, the cost of an execution plan can be expressed in units of I/O usage, CPU usage, network usage, memory usage, or a single numerical value that combines several of these units.

An "optimizer" is used by a database system to choose what is believed to be the most efficient execution plan for a SQL statement. A "cost-based" optimizer bases its decision upon the costs of each execution plan. The cost-based optimizer typically generates a set of potential execution plans for the SQL statement based upon available access paths for the data sought to be operated upon by that statement. The cost is then estimated for each execution plan based upon, for example, data distribution and storage characteristics for database structures holding relevant data for the SQL statement. The optimizer then compares relative costs of the execution plans to choose the one with the smallest cost.

The cost-based optimizer may use statistics to estimate the cost of the execution plans. Statistics are used to quantify the data distribution and/or storage characteristics of data in database structures. For example, with reference to the SQL statement example set forth above, statistics may be kept for the distribution of values in the "salary" column of the table "emp_table." Selectivity estimates can be performed by taking into account the data skew of data values. Selectivity is normally calculated with reference to the statistics, and can be stated as the percentage of entries within a schema object that satisfies a given predicate.

The cost of an execution plan can be estimated based upon the statistics and selectivity associated with terms within the SQL statement predicate. As an example, consider if an index exists upon the "salary" column for the above SQL statement example. If so, then the following is an example of a cost calculation that can be used to estimate the cost of an execution plan that uses an index to execute the above SQL statement:

$$COST = (\text{cost of access for a single row}) * (\text{selectivity}) * (\text{number of rows in table}) + (\text{cost of index access})$$

An example of a cost calculation for an execution plan that performs a full table scan is expressed as follows:

COST=(cost of access for a single row of table)*(number of rows in table)

Based upon such cost calculations, an optimizer can make a determination as to which of these execution plans is relatively less costly.

Typical database systems have built-in support for certain "system-supplied" objects, such as built-in data types, functions, and access methods. For example, "CHAR" is a common built-in data type that is used to store character strings. B+Trees and Hash Indexes are two examples of built-in access methods that can be found in conventional database systems.

In recent years, databases are being used to store different types of data, such as spatial, image, video, and audio data. Often, these data types are not native to the database system; it is unrealistic to attempt to provide native support for all possible data types since it is impossible to foresee all possible types of complex data that may be created for storage in the database. Therefore, some database systems can be configured to allow non-native or "user-defined" data types to be defined for the database. For many of these non-native data types, system-supplied access methods and functions cannot be applied to operate upon them, since the structure and characteristics of these data types are not known or supported by the system-supplied access methods and functions. To provide efficient data operations upon these data types, non-native or user-defined access methods and functions can also be defined to extend the operation of the database system.

Because the structure, operation, and characteristics of built-in objects are known to the database system, and to the designers of the system-supplied database optimizer, traditional optimizers can generate cost estimates for execution plans involving such native objects or access methods. These cost estimates can be used to choose an optimal execution plan for a SQL statement involving built-in objects.

Unfortunately, traditional optimizers encounter significant problems attempting to generate an optimal execution plan if the SQL statement involves non-native objects, such as user-defined data types, functions, and access methods. This results because the system-supplied cost, selectivity, and statistics functions are not specifically configured to recognize or work with non-system-supplied entities, operations, and access methods. If the optimizer cannot accurately estimate the cost of an execution plan involving non-native objects, then relatively inefficient or slow execution plans may be mistakenly chosen by the optimizer.

One approach that can be used to address this problem is to utilize default cost, selectivity, or statistics values to determine the relative costs between execution plans. If a non-native objects is encountered by the optimizer, default values would be used to generate the cost of an execution plan. However, using default values to calculate the cost of an execution plan results in what is at best a gross approximation of the true cost of the execution plan. Furthermore, such default values do not take into account any parameters that may be passed to a predicate involving a user-defined object. This may result in the selection of an execution plan that has a significantly higher true cost than other execution plans that could have been chosen.

Therefore, there is a need for a method and mechanism that can optimize the execution of database statements that involves non-system supplied entities, objects, or operations.

SUMMARY OF THE INVENTION

A method and system for optimizing the execution of database statement is described. An aspect of the invention is related to providing a framework for the creation, association, and use of optimizer-related functions to calculate the cost of execution plans involving non-native database entities. Examples of these optimizer-related functions include selectivity, statistics, and cost functions. Another aspect of the invention is related to the optimization of database statements having non-boolean predicates. Yet another aspect of the invention is related to the determination and use of different granularity levels of information for submitting database statement predicates to optimizer-related functions. The invention can also be applied to define optimizer-related functions for system-supplied objects and entities.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the detailed Description of Embodiment(s), serve to explain the principles of the invention.

FIG. 5 depicts a table for associating non-native optimizer-related functions with objects in a database system according to an embodiment of the invention.

DETAILED DESCRIPTION

A method and mechanism for optimizing the execution of database statements involving non-system supplied objects is described. In the following description, for the purposes of explanation, numerous specific details are set forth in order to provide a thorough understanding of the present invention. It will be apparent, however, to one skilled in the art that the present invention may be practiced without those specific details. In other instances, well-known structures and devices are shown in block diagram form to avoid obscuring the present invention.

Extensible Optimizer

Figure 1:
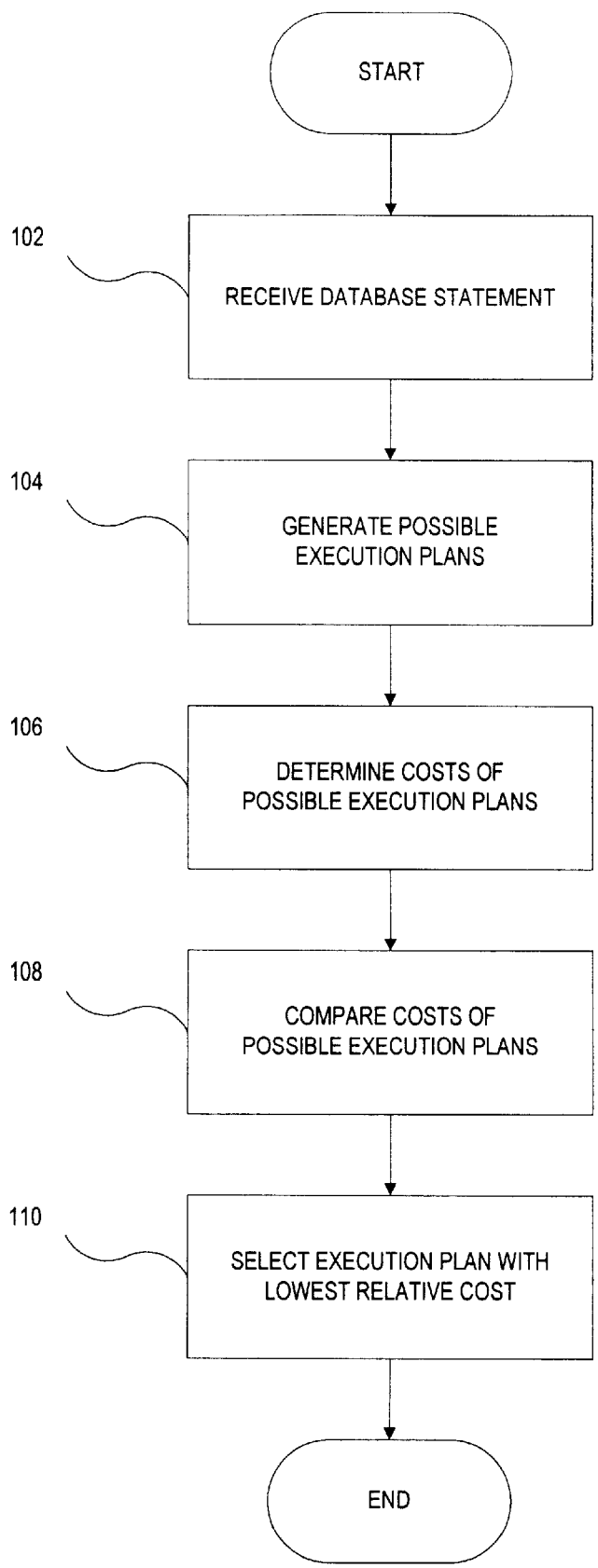
FIG. 1 is a process flow showing process actions for an embodiment of the invention.

FIG. 1 depicts the operations of an optimizer according to an embodiment of the invention. The optimization process initiates when the optimizer receives as input a SQL statement (102). Based upon available access paths, the optimizer generates one or more possible execution plans in response to receiving the database SQL statement (104). Each possible execution plan provides a different combination or order of steps to accomplish the results sought by the SQL statement.

The optimizer then computes the estimated cost for each of the generated execution plan (106). The estimated costs may be generated by use of statistics or selectivity values for the entities, objects, or operations accessed by the SQL statement. The estimated costs for each execution plan are compared to determine the execution plan having the lowest relative cost (108). The optimizer then selects for execution the execution plan having the lowest relative cost (110).

Figure 2:
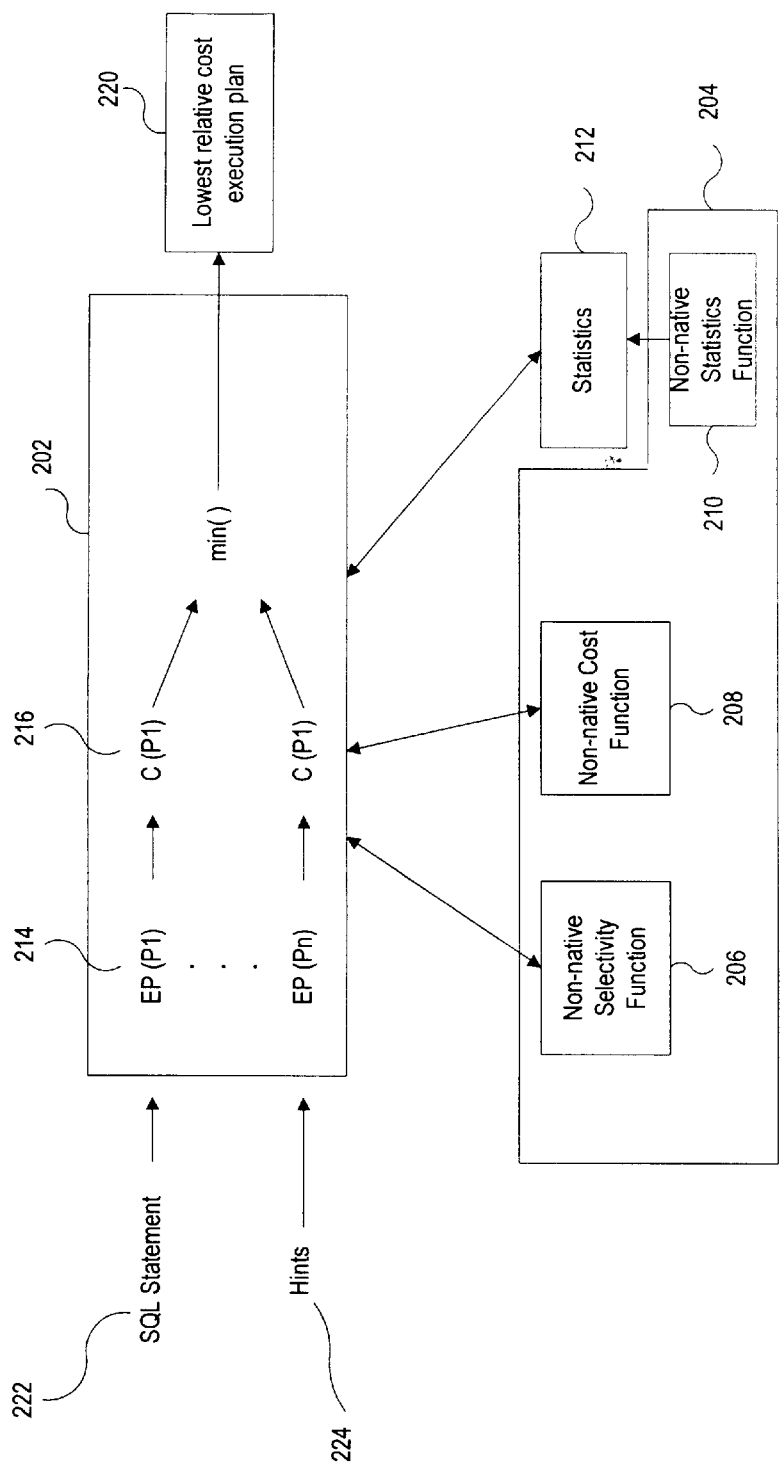
FIG. 2 functionally depicts an embodiment of an optimizer.

Referring to FIG. 2, shown is a functional depiction of an optimizer 202 according to an embodiment of the invention. Optimizer 202 receives a SQL statement 222 as an input. In response to receiving SQL statement 222, the optimizer 202 generates one or more alternate execution plans 214 (shown as EP(P1) to EP(Pn)). The optimizer 202 then estimates costs 216 for each execution plan 214. The costs 216 are shown in FIG. 2 as C(P1) to C(Pn). The costs 216 of all execution plans 214 are compared to select the execution plan 220 having the lowest relative cost.

As mentioned above, database systems may encounter objects for which the database system does not have built-in support. According to an embodiment of the invention, a mechanism is provided to extend the operations of a database system, which allows for the designation of non-native cost, statistics, selectivity functions that will be used by an optimizer to select an execution plan. The present invention can be employed to designate cost, selectivity, and statistics functions for all non-system supplied objects, such as for example, user-defined functions, indexes, indextypes, packages, and columns. In addition, the present invention can be equally utilized to define such optimizer-related functions for system-supplied objects that already have built-in support in the database system.

Referring back to FIG. 2, the present invention provides a framework for allowing the definition and association of non-native optimizer related functions. For example, user-defined selectivity functions 206, cost functions 208, and statistics functions 210 can be defined as extensions to a system-supplied optimizer 202. One approach to implementing these non-native functions is to define a new optimizer object type 204 having a standard interface. The new optimizer object type 204 would have one or more defined methods or functions that address different optimizer-related needs of the object(s) to which it is directed. According to an embodiment, a new optimizer object type is defined for each non-native object or category of non-native objects which may need to be accessed by an optimizer. The responsibility for building and maintaining the optimizer object type 204 is given to the domain expert familiar with the entity for which costs, selectivity, or statistics is to be determined. The optimizer object type 204 acts as an extension to the optimizer 202. Alternatively, each function type can be separately defined for objects on the system, without being grouped within an optimizer object type 204.

The overall goal of the optimizer may change, depending upon the specific needs of the user or system. For example, the optimizer may be configured to select an approach that maximizes throughput (minimizes resource use for the processing of all data for the SQL statement). In addition, the optimizer can be configured with the goal of achieving the best response time (e.g., by minimizing resource use necessary to process only the first set of data accessed by the SQL statement).

Hints 224 may be passed to the optimizer 202 to guide the selection or operation of an execution plan. According to an embodiment, hints 224 are provided at run-time so that even statically defined functions can dynamically have their performance or operational characteristics changed, based upon the instant needs of the user or system.

The following is an example of an embodiment of a database statement having a run-time hint within its terms:

| | |
|---|---|
| SELECT * | /*+ ORDERED_PREDICATES*/ |
| FROM | TABLE1, TABLE2 |
| WHERE | TABLE1.SHAPE = SQUARE AND |
| | TABLE2.SHAPE = CIRCLE |

This SQL statement searches for all entries from tables TABLE1 and TABLE2 in which the SHAPE column of TABLE1 contains the value of "SQUARE" and the SHAPE column of TABLE2 contains the value of "CIRCLE".

The hint in this example is the term:

/*+ORDERED_PREDICATES*/

This particular example of a hint forces the optimizer 202 to preserve the order of predicate evaluation as specified in the WHERE clause of the SELECT statement. When the optimizer 202 encounters a supported hint, the run-time execution and optimization of the respective database statement is performed to accommodate the requirements of the hint, even if the resultant execution plan that is selected is not the one that would otherwise be used.

Other and additional hints may be employed according to the invention. For example, hints to optimize either throughput or response time may be used to alter the data acquisition and return characteristics of the execution plan. A "NO_INDEX" hint can be used to avoid the use of execution plans that utilize indexes.

Figure 3:
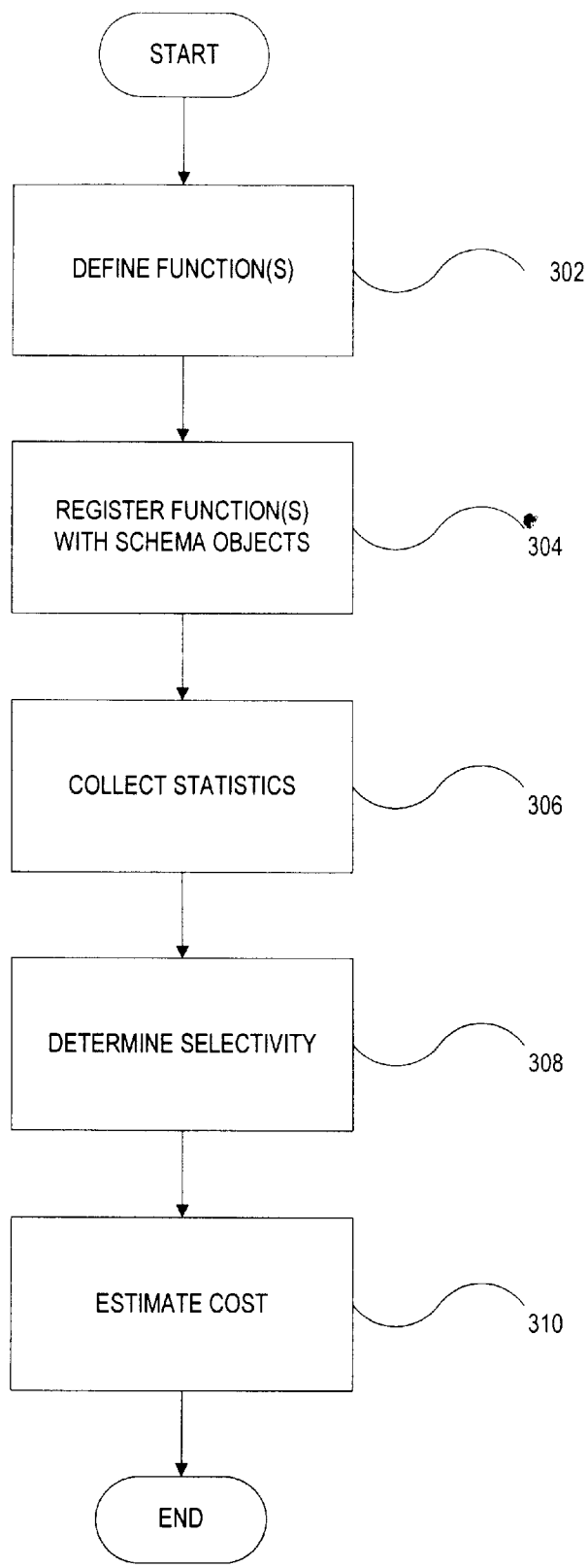
FIG. 3 is a process flow showing process actions for determining costs of an execution plan according to an embodiment of the invention.

FIG. 3 provides an overview of the process actions performed by an embodiment of the invention to determine the costs of an execution plan. In process action 302, non-system supplied optimizer-related functions, such as cost, selectivity, and statistics functions are defined for objects in the database system. These functions are developed with reference to the specific structure and characteristics of the objects to which they are directed. According to an embodiment, functions directed to a common object are grouped as a single optimizer object type. It is noted that not all objects on the system need all of these types of optimizer-related functions to be defined for them; thus, a particular optimizer object type may comprise any combination or number of the functions.

The non-system supplied cost, selectivity, and statistics functions are associated or registered with one or more schema objects or categories of objects in the system (process action 304). In operation, this can be performed by registering the optimizer object type with one or more specific objects, or by registering the optimizer object type with an entire category or family of objects.

If it is desired to collect statistics for an object, and if there is a statistics function that is registered for that object or category of objects, then that registered statistics function is called to collect statistics (306). Statistics are not normally collected at the time the optimizer processes a statement involving an object. In normal anticipated usage, it is expected that statistics are collected for system objects in a periodic manner (either regularly or irregularly).

When a SQL statement is processed involving an object for which a non-native selectivity or cost function has been registered, the registered cost and/or selectivity function is called by the optimizer to determine the estimated cost of an execution plan involving that object (308 and/or 310). The collected statistics from process action 206 may be used in determining the cost or selectivity of predicates in the SQL statement. The relative costs of alternate execution plans can thereafter be compared to select the appropriate execution plan to be used.

Defining Statistics Functions

The present invention provides a mechanism for defining statistics collection functions for objects in the database system, including non-native objects such as user-defined indexes, indextypes, data types, and columns. In typical database systems, a system command is issued to collect statistics for objects on the system. For example, the Oracle 8 database product available from Oracle Corporation of Redwood Shores, Calif., utilizes the "ANALYZE" command to initiate the collection of statistics. In the present invention, such a statistics collection command is extended to call non-native statistics collection functions where appropriate.

An optimizer object type can be defined for objects on the database system. The optimizer object type can be defined to include non-native statistics functions. According to an embodiment, if the optimizer object type is directed to objects for which statistics are to be collected, then the optimizer object type is defined having two statistics functions. A first function, referred to herein as a StatsCollect function, is used to collect statistics for the object or object type. The following is an example of a function interface that can be used for a StatsCollect function:

FUNCTION StatsCollect(column/index identifier, options, statistics OUT)

If the StatsCollect function is used to collect statistics for a column, then a column identifier is passed to the function. Similarly, if the function is used to collect statistics for an index, then an index identifier is passed to the function. The "options" parameter indicates any processing options that may be set when the function is invoked. For example, the options parameter can be used to specify the sample size used to collect the statistics. In an embodiment, the statistics collected by the StatsCollect function are returned in the output parameter "statistics" as raw data. This is because the specific output of a user-defined statistics collection function may be in a format that is not understandable by the database system. Thus, the database system stores the collected results in a raw format, to be later interpreted by a user-defined selectivity or cost function that is specifically configured to work with the particular statistics format that has been produced.

A second type of statistics function, referred to herein as the StatsDelete function, is used to delete previously collected statistics from the system. The following is an example of a function interface that can be used for a StatsDelete Function:

FUNCTION StatsDelete (column/index identifier)
According to an embodiment, this function takes a single parameter: a "column identifier" parameter to identify column statistics that are to be deleted or an "index identifier" parameter to identify index statistics that are to be deleted.

As an illustrative example, consider a table "T1" which is defined as follows:

```
CREATE TABLE T1 (
    col1 obj_type1
)
```

Assume that "obj_type1" is a non-system supplied object type. Since the column entries are composed of a non-native object type, the structure of the data within column T1.col1 may not be comprehensible to the built-in statistics collection function of the database system.

If it is desirable to collect statistics for column T1.col1, then an optimizer object type can be defined to address the specific structure and properties of the data within column T1.col1 as well as the type of statistics sought to be collected for this column. The details of the StatsCollect and StatsDelete functions for this new optimizer object type would be defined by a user, administrator, or domain expert that is familiar with the structure and properties of the non-native object type "obj_type1". Once the optimizer object type has been defined, it is associated or registered with one or more objects on the system.

FIG. 5 depicts an embodiment of a database table that can be used to register optimizer object types with objects or entities on the database system. Association table 502 comprises an object column 504 that identifies an object for which an optimizer object type is being registered. The optimizer object type column 508 identifies the optimizer object type that is being registered with the object identified in object column 504. Properties column 506 identifies the schema type for which the association has been defined (e.g., column, type, package, function, etc.).

Association table 502 also includes one or more defaults columns. Column 512 contains default selectivity value(s) for the object identified in the object column 504. Column 514 contains default cost value(s). Default values can be used whenever the cost/selectivity functions are not registered with an object. Default values can also be used if it is not desired or needed to incur the overhead of generating a new cost and selectivity function. An example would be the situation when the cost or selectivity is independent of the arguments to an object (e.g., function, predicate, etc.). Under this circumstance, the cost and selectivity values are relatively constant and default values can effectively be used.

For the purposes of illustration, consider if a new optimizer object type "Stats" has been defined to extend optimizer functions for objects of type "obj_type1". If it is desired to collect statistics for a column of this type, then StatsCollect and StatesDelete function methods can be defined within the Stats object type.

According to an embodiment, there are two approaches to registering objects with optimizer object types. A first approach is to directly register the optimizer object type with one or more objects or entities in the database system. A second approach is to register the optimizer object type to an entire category of objects or entities. Further details regarding the registration of entire categories or families of object types are provided in co-pending U.S. application Ser. No. [Not Yet Assigned], Attorney Docket No. 238/264, filed on even date herewith, which is hereby incorporated by reference in its entirety.

Row 518 is an example of the first approach in which an optimizer object type is registered for a specific object on the system. Row 518 is directed to registering the optimizer object type "Stats" with the column T1.col1. The object column 504 of row 518 identifies "T1.col1" as the object for which an optimizer object type is being defined. Column 508 identifies "Stats" as the identifier of the optimizer object type being associated with column T1.col1. The properties column 506 identifies object "T1.col1" as a schema object "column". In the example of FIG. 5 default selectivity and cost values are not provided for column "T1.col1".

Row 516 is an example of the second approach, in which an optimizer object type is registered for an entire category of objects. Column 504 of row 516 identifies the type "obj_type1" as the category of objects which is being registered. Column 508 identifies the optimizer object type "Stats" as being registered to the object category identified in column 504. Column 506 confirms that the schema type of the object identified in column 504 is a "type". Column 512 contains a default selectivity value of "0.5" for the object identified in object column 504. Column 514 contains a default cost value "x" for object type "obj_type1".

Figure 4:
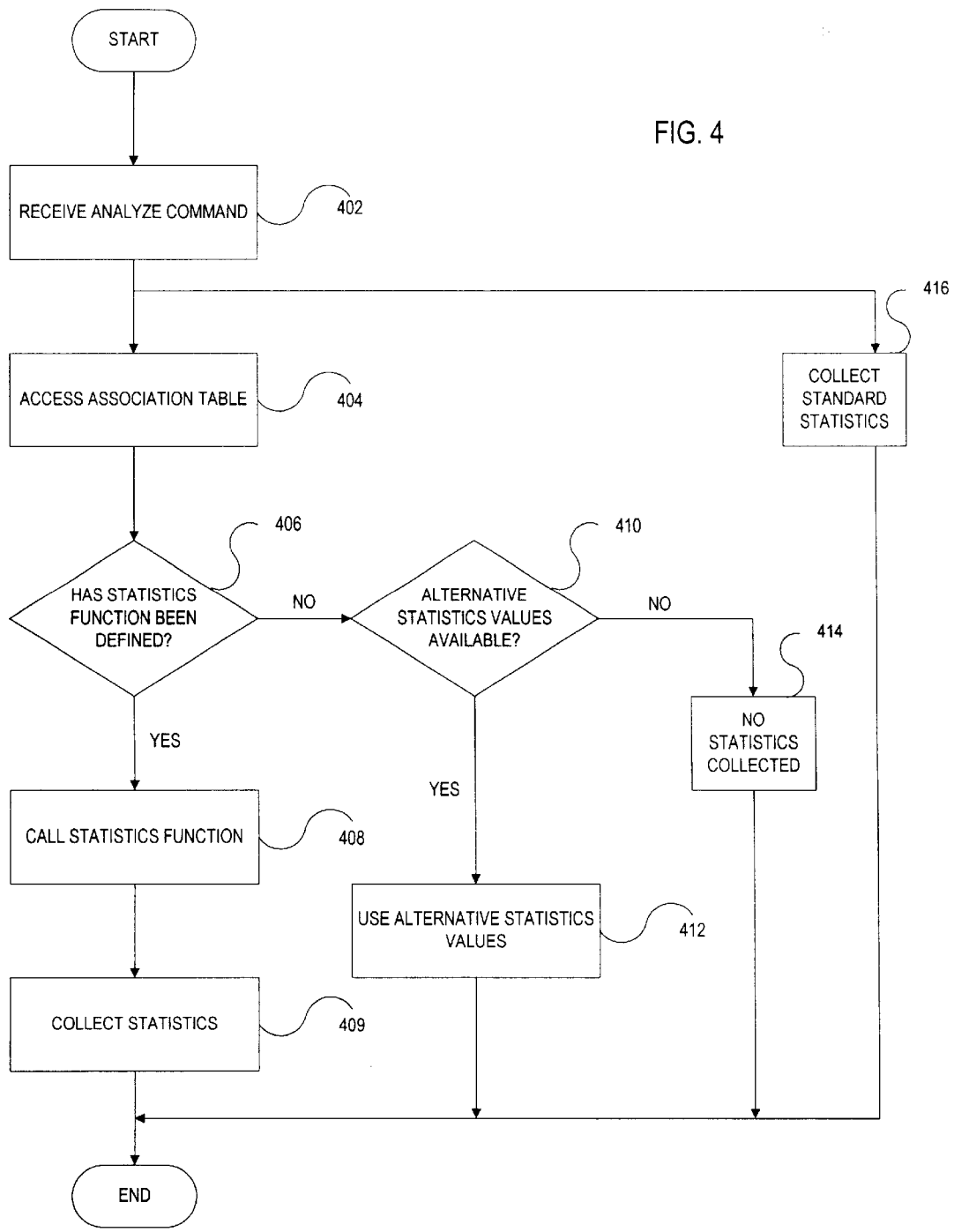
FIG. 4 is a process flow for collecting statistics according to an embodiment of the invention.

Under either approach, the "Stats" optimizer object type would be associated with the column "T1.col1". FIG. 4 depicts an embodiment of a process for collecting statistics using a non-native statistics function. To invoke the registered statistics collection function for column "T1.col1", an ANALYZE command (or its equivalent in the particular database system to which this invention is directed) is initiated with column "T1.col1" as the input argument (402). The ANALYZE command checks with association table 502 to determine if there is an optimizer object type registered for this column (404). If there is such a registration, then a verification is made to determine if statistics functions have been defined for the optimizer object type (406). If it exists, then the statistics collection function is invoked (408) to collect statistics for the "T1.col1" column (409).

If a statistics collection function has not been defined for the optimizer object type, or if it cannot be used at that time, then a determination is made if alternative statistics valuation methods are available (410). For example, default statistics values may be available for the object type of the T1.col1 column. Alternatively, the database system may be configured to use heuristics to determine alternative statistics values. If alternative statistics valuation methods are available, then they can be employed at this time (412). If they are not available, then no user-defined statistics are collected (414). It is noted however, that standard statistics can be collected even if non-native statistics collection function is not available (416). Standard statistics are collected using the built-in statistics collection functions of the database system. However, the standard statistics may not provide an accurate result if it is directed towards non-native objects or object types.

Figure 6:
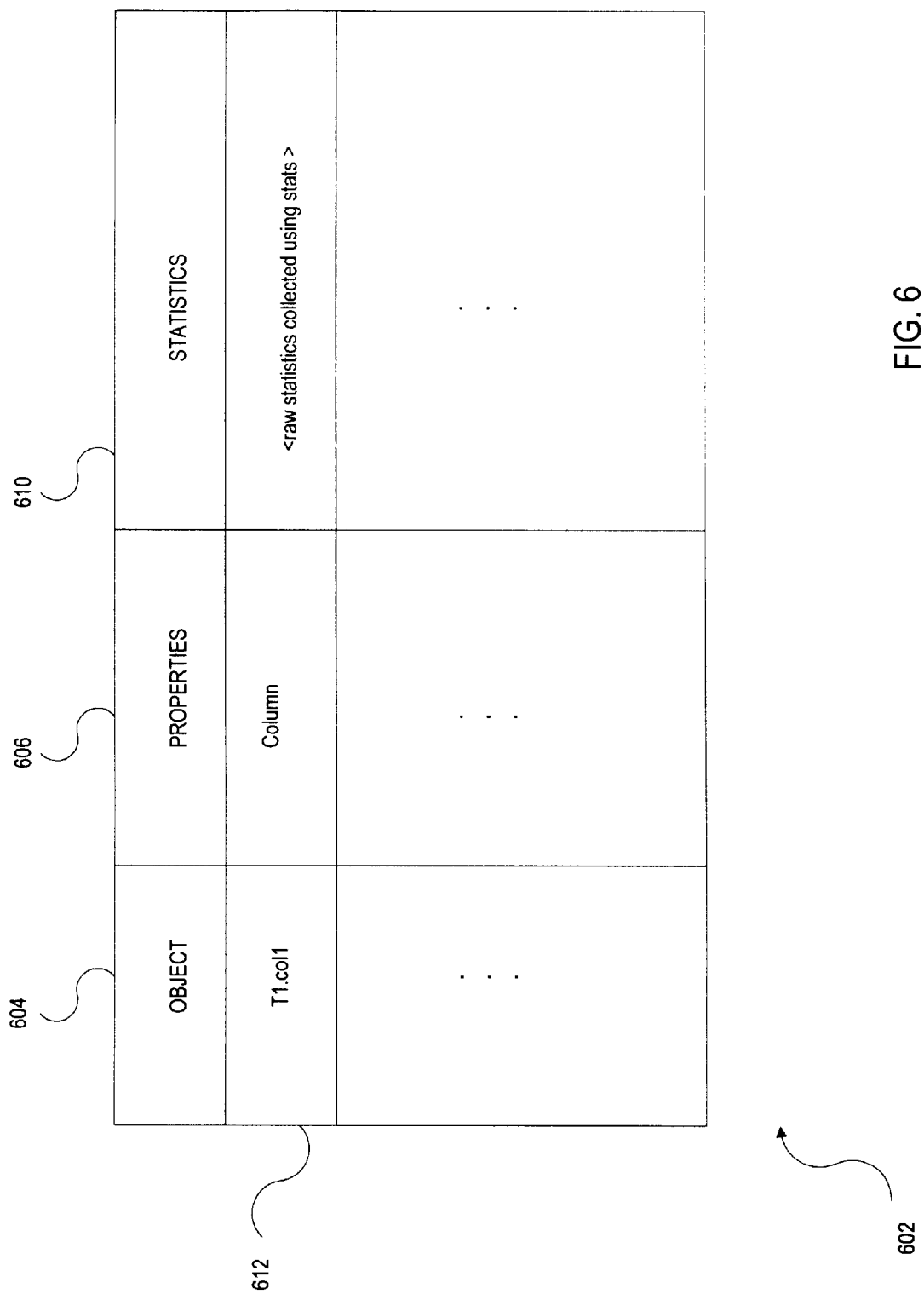
FIG. 6 depicts a table for collecting statistics according to an embodiment of the invention.

FIG. 6 depicts an embodiment of a database table that can be used to store the results of executing a non-native statistics collection function. Statistics table 602 comprises an object identifier column 604 that identifies the object for which statistics have been collected. A properties column 606 contains information regarding certain properties of the collected statistics. For example, the property column 606 can contain information regarding whether statistics are being collected for a column or an index. The statistics column 610 contains the raw statistics data that has been collected for the object identified in the object identifier Column 604.

Row 612 is an example of an entry to store the results of collecting statistics for column "T1.col1" of table "T1". The object identifier column 604 of row 612 identifies column T1.col1 as the object for which statistics has been collected. Properties column 606 indicates that statistics are being collected for a column. Column 610 of row 612 contains the raw statistics that have been collected.

Once the collected statistics are no longer needed, the statistics can be deleted from the statistics table 602. To accomplish this, the StatsDelete function that has been defined for the stats optimizer object type can be called to delete the collected statistics.

According to an embodiment of the invention, only non-native objects can be associated with new optimizer object types; statistics for native object types must be collected using system-provided statistics functions. Alternatively, every object on the system, whether native or not, can have a new optimizer object type defined for it. In this alternate approach, registering a new optimizer object type for a native object or object type overrides the system-provided optimizer functions for that object.

Defining Selectivity Functions

Selectivity functions are used by optimizers to compute the selectivity of predicates in a SQL statement. When used in the relational or object/relational database model, the selectivity value is generally considered the fraction of rows of a table that satisfies a given predicate. Thus, the selectivity of a predicate is normally a numerical value between 0 and 1. The optimizer may use statistics that have been collected to calculate the selectivity of a predicate. The selectivity of a predicate is used to estimate the cost of a particular access method. Selectivity values can also be used to determine optimal join orders.

The present invention provides a mechanism for defining non-system supplied selectivity functions for predicates in SQL statements, including predicates containing non-native objects such as user-defined functions, operators, data types, type methods and packages. According to an embodiment of the invention, non-system supplied selectivity functions are called by the optimizer when encountering a predicate having one of the following forms:

op( . . . ) relop <constant>
<constant> relop op( . . . )
op( . . . ) LIKE <constant> where op( . . . ) refers to a non-native operator, function, package function, or type method, "relop" refers to one of the following operators: "<, <=, =, >=, >," and "<constant>" refers to a constant value expression or bind variable.

Consistent with the invention, selectivity functions can be defined that are associated with the operator "op( . . . )". The arguments to op( . . . ) can be any object or entity, including columns, constants, bind variables, or attribute references. When such a predicate is encountered, the optimizer will call the appropriately defined selectivity function, and pass the entire predicate as an argument.

To define a non-native selectivity function, an optimizer object type is created having a selectivity function. The selectivity function would be configured to specifically focus upon the structure or properties of the object or object type addressed by the operator op( . . . ). The selectivity function can be implemented to access statistics that have been collected into a statistics table 602.

As an illustrative example, consider a table "T2" which is defined to have a column "col2" of a non-native object type "obj_type2", as set forth below:

CREATE TABLE T2 (
    col2 type2
)

User-defined indexes, indextypes, and operators can be created that are directed to objects of non-native object type "obj_type2". Details of a method and mechanism for processing a database statement using user-defined indextypes are disclosed in co-pending U.S. application Ser. No. 08/677,159, entitled "Extensible Indexing", filed Jul. 9, 1996, which is hereby incorporated by reference in its entirety. For the purposes of illustration, assume that a user-defined index of indextype "index_type2" has been created to index "obj_type2" objects and that a user-defined operator "user_op2( )" is supported by "index_type2". A user-defined index "index_col2" of indextype "index_type2" can thereafter be created for the "col2" column of table "T2".

If it is desirable to collect statistics or compute selectivity for the user-defined index "index_col2", then a new optimizer object type can be defined to address the specific structure and properties of this indextype, as well as the type of statistics sought to be collected for this index. The details of the StatsCollect, StatsDelete and selectivity functions for this new optimizer object type would be defined by a user, administrator, or domain experts that is familiar with the structure and properties of the non-native indextype "index_type2". Once the new optimizer object type has been defined, it can be registered or associated with one or more objects on the system.

If a new optimizer object type "Stats2" has been defined for "index_type2", then registration can be made with respect to either the entire indextype, or for each individual member of that indextype. Referring back to the association table 502 of FIG. 5, row 520 shows the optimizer object type "Stats2" being associated with the indextype "index_type2". The object column 504 of row 520 indicates that registration is being made with respect to the "indextype" object. Column 508 of row 520 identifies "Stats2" as the optimizer object type which is being associated with the "index_type2" object. The properties column 506 for row 520 identifies the schema type of the object to which the optimizer object type is being registered (i.e., indextype).

Recall that an operator "user_op2( )" has been defined that is supported by indextype "index_type2". If a SQL statement is issued having a predicate involving "user_op2( )", then the optimizer may need to determine the selectivity of this predicate. For example, if the following predicate is encountered in a SQL statement:

user_op2(T2.col2)=1 then the optimizer will seek to determine the selectivity of this predicate to determine the optimal execution plan. However, since the characteristics of the non-native operator user_op2( ) may not be known to the built-in selectivity functions, an accurate selectivity value cannot be determined using conventional optimizers.

According to the present invention, a non-native selectivity function can be created which is configured to operate with the exact structure and characteristics of the operator "user_op2( )". A new optimizer object type can be created having a selectivity function to determine the selectivity value for such an operator. The user-defined selectivity function can be implemented to obtain the exact selectivity of a predicate, by considering all statistics values of a particular object that has been collected. Alternatively, an estimated selectivity can be obtained by taking a sample size that is less than all of the collected statistics.

Referring back to the association table 502 of FIG. 5, row 522 comprises an example of a registration entry for associating a new optimizer object type "Stats_op_fn" with the "user_op2( )" operator. The object column 504 identifies the object "user_op2( )" as the object for which registration is being made. Column 508 identifies optimizer object type "stats_op_fn" as being associated with the "user_op2( )" operator. The "Stats_op_fn" optimizer object type includes a selectivity function that has been defined to operate with the format of the statistics to be collected for the parameters of this operator.

In operation, an ANALYZE command would be issued prior to the invocation of the selectivity function. The ANALYZE command would invoke a StatsCollect function to collect statistics for the object of interest. In the present example, the StatsCollect function for the "Stats2" optimizer object type would be invoked to collect statistics for the column "T2.col2". If a SQL statement having the predicate "user_op2(T2.col2)=1" is thereafter issued, then the selectivity function defined for the "Stats_op_fn" optimizer object type would be called to generate the selectivity of the predicate based upon the collected statistics.

A significant disadvantage with current optimizers is that conventional cost or selectivity functions are only able to process predicates which are boolean functions. In other words, conventional selectivity and cost functions are limited to SQL statements of the form "f( )==TRUE" or "f( )==FALSE". Hence, conventional optimizers do not have mechanisms that can accurately determine the selectivity or cost of the class of predicates of the form "function( ) relop value-expression" where relop is {<, <=, =, >=, >}.

The present invention is capable of addressing this problem, by allowing range values to be passed to the selectivity (or cost) function of an optimizer object type. According to an embodiment, the range values are expressed in terms of the start and stop bounding values, and further includes flag(s) which indicate if the bounding values are included or excluded from the range. The following is an example of a function interface that can be used for a non-native selectivity function according to an embodiment of the invention:

FUNCTION Selectivity(predicate, arguments, start, stop, <function arguments>, sel OUT)

The parameter "predicate" describes/identifies the object "op( . . . )", its functional implementation, and its use and relationship with the relational operator "relop". The parameter "arguments" describes/identifies range information for the "start" and "stop" values, as well as the actual arguments to the "op( . . . )" object. The parameter "start" describes the start value of the range for the op( . . . ) object. The parameter "stop" describes the stop value of the range for the op( . . . ) object. The parameter "<function arguments>" identifies a list of function arguments whose number, position, and type should match the arguments of the object "op( . . . )". The computed selectivity is returned in the output parameter "sel", preferably in a whole number as a percentage between 0 and 100.

The "start" parameter indicates the lowest bounding value for the range of the predicate. The "stop" parameter indicates the highest bounding value for the range of the predicate. Flags can be set to indicate if the "start" or "stop" values are included or excluded from the range. As an example, consider a predicate of the following form:

Foo( )<10

Conventional optimizers cannot compute an accurate selectivity value for this predicate because it is not in the form of a true boolean function. However, the present invention is able to process this predicate by setting "start" and "stop" bounding values for the range of this predicate. The start parameter for this predicate would be set at "−infinity". The stop parameter would be set at "10". Flags would be set to indicate that the "stop" value is excluded from the range.

As another example, consider the following predicate:

Foo( )>10

The start parameter for this predicate would be set at "10". The stop parameter would be set at "infinity". Flags would be set to indicate that the "start" value is excluded from the range.

The following is yet another example:

Foo( )=10

In this situation, the start parameter would be set at "10". The "stop" parameter would also be set at "10". Flags would be set to indicate that the "start" and "stop" values are included in the range.

Defining Cost Functions

Cost functions are used by optimizers to compute the cost of potential access paths. Various system resources may be considered in determining the cost of an access path. The following are examples of system resources for which a cost estimate may be obtained for an execution plan or access path:

(a) cpu resources, including the number of machine instructions to be executed;

(b) I/O resources, including the number of data blocks to be read; and (c) network resources, including the number of data blocks to be transmitted over a network.

The present invention provides a mechanism for defining non-system supplied cost functions to determine the cost of objects, entities, and operations in the database system. For example, the present invention can be employed to define cost functions for user-defined indexes, user-defined and standalone functions, package functions, and type methods. According to an embodiment of the invention, non-native cost functions will be called when a predicate has one of the following forms (this is similar to the above description of use for an embodiment of non-native selectivity functions):

op( . . . ) relop<constant>

<constant>relop op( . . . )

op( . . . ) LIKE<constant> where op( . . . ) refers to a non-native operator, standalone function, package function, or type method, "relop" refers to one of the following operators: <, <=, >=,>, and "<constant>" refers to a constant value expression or bind variable.

As with non-native selectivity and statistics functions, the non-native cost functions are defined to specifically focus upon the structure and properties of the object or object type addressed by the cost function. To define a non-native cost function, an optimizer object type is created having a cost function method. The optimizer object type can be registered to one or more objects or entities on the database system, to be called by the optimizer if a corresponding predicate is encountered in a SQL statement.

According to an embodiment of the invention, separate function interfaces are used based upon the particular object for which cost is to be determined. The following is an example of a function interface for a non-native cost function that determines the cost of using a user-defined index to evaluate an operator:

FUNCTION IndexCost (index, selectivity, cost OUT, query-info, pred, arguments, start, stop, <list of operator arguments>)

The parameter "index" refers to the user-defined index for which the cost is being computed. The parameter "selectivity" is the user-computed selectivity of the predicate. The output parameter "cost" is the computed cost output for the index. The parameter "query-info" refers to additional information or hints regarding the SQL statement that are used by the cost function to compute the cost. Examples of such information or hints include the optimizer goal (e.g., throughput or response time) or whether an index should return sorted tows. The parameter "pred" refers to the user-defined operator that corresponds to the user-defined index. The parameter "start" identifies the lower bound of the operator (e.g., "2" for a predicate foo( )>2). The parameter "stop" identifies the upper bound of the operator (e.g., "2" for a predicate foo( )<2). The parameter "arguments" is a descriptor of the start, stop, and actual value arguments with which the operator is called. If the operator has n arguments, the arguments parameter will contain n+1 elements, the first element describing the start value, the second element describing the stop value, and the remaining n-I elements describing the actual value arguments of the operator (i.e., excluding the first argument). The parameter "<list of operator arguments>" refers to the list of actual arguments to the operator.

As with the description of non-native selectivity functions above, the present invention allows cost functions to operate with non-boolean predicates. The "start" and "stop" parameters can be input to the cost function to define the upper and lower bounds of the predicate.

The following is an embodiment of a function interface for a non-native cost function that estimates the cost of a user-defined function:

FUNCTION FunctionCost (function, cost OUT, arguments, <list of function arguments>)

The parameter "function" refers to the user-defined function or type method for which the cost is being computed. The output parameter "cost" is the computed cost of the function. The parameter "arguments" is a descriptor of actual arguments with which the function or type method is called. If the function has n arguments, the arguments parameter will contain n elements, each describing the actual arguments for the function or type method. The parameter "<list of function arguments>" refers to the list of actual arguments to the function.

As with the non-native selectivity and statistics functions described above, an association table can be used to register optimizer object types having a cost function with particular objects in the database system. The optimizer object type is defined with a subset of functions that include statistics, selectivity, and/or cost functions. The optimizer object type does not necessarily have to include all three function methods; in fact, for certain types of objects, it may not make sense to define one or more of these functions. An entry is made in the association table having information regarding the registration of the statistics function type with an object, object type, or entire category of objects.

Referring back to the association table 502 of FIG. 5, row 524 depicts an example of a registration entry for an optimizer object type having a cost function method. Column 504 of row 524 identifies an operator "user_op3( )" as the object for which registration is being made. Column 508 identifies optimizer object type "stats_op_fn_3" as the optimizer object type being associated with object "user_op3( )". Column 506 indicates that registration is being made to an object of schema type "operator". Columns 512 and 514 provide default values for this registered object.

In the normal contemplated usage of the invention, a SQL statement is received containing a predicate involving a registered object or object type. The optimizer would generate alternate execution plans involving the object. If a cost function has been defined for the optimizer object type associated with the object, then the cost function can be called to estimate the cost of one or more of the execution plans. If a cost function has not been defined, then default cost values or heuristics can be used to provide an approximation of costs.

Altering Granularity Of User-Defined Optimizer Functions

A limitation to the usefulness of utilizing cost and/or selectivity functions to optimize a database statement is that there exists inherent costs just to invoke these functions. One significant cost relates to the amount of information that must be passed to the cost/selectivity function. As an example, consider the following predicate:

Foo(a,b)=false

Significant expenses may have to be incurred to invoke the respective cost/selectivity functions for this predicate. For example, system resources may have to be used to pickle or unpickle this information when transmitting this information to the cost/selectivity functions. The greater the amount of information that needs to be pickled/unpickled, the greater the expense of the pickling operation. In addition, the network costs to send this information increases as a factor of the amount of information that must be sent across the network to the cost/selectivity functions. The optimization process only makes sense if the cost of optimization is outweighed by the gains from selecting a more optimal execution plan.

Cost and selectivity values for a predicate can be estimated under certain circumstances, even if the entirety of the information regarding a predicate is not sent to the cost/selectivity function. However, the level of accuracy that may be achieved may be dependent upon the quantity of information regarding the predicate that is actually sent. For example, if the entire predicate:

Foo(a,b)=false is sent to the cost/selectivity function, then the cost/selectivity function is assumed to be able to calculate the cost or selectivity with a high degree of accuracy.

If only part of the information regarding the predicate is sent, such as for example, if only the function name and one function parameter is sent to the cost/selectivity function:

Foo(a,)

then the optimizer may still be able to estimate cost and selectivity values for this predicate. This results because the information that is being sent (i.e., the name of the operator and the argument "a") may provide enough information to determine a cost or selectivity value. For example, if it is known that variable "a" is declaratively constrained to a certain range of values, then sending this variable to a cost or selectivity function provides information that can be used to determine a cost or selectivity value, even if other arguments are not provided. It is noted that sending only part of a predicate to cost/selectivity functions may result in cost/selectivity estimates that are less accurate than if all of the information is being sent. However, depending upon the configuration of the database system, the saving in system overhead by sending this reduced amount of information (when multiplied by a large number of calls to many cost/selectivity functions) may be significant. Depending upon the exact structure or configuration of the object for which the cost/selectivity value is sought, the reduction in accuracy may be acceptable if there is a significant reduction in system overhead that results from sending less information regarding the predicate to the cost/selectivity functions. Moreover, sending less information does not necessarily lend to a poorer estimation of cost or selectivity in all cases. Under certain circumstances, the cost and estimation estimates may not suffer a decrease in accuracy by sending less information.

The present invention provides a mechanism whereby varying levels of granularities of information may be used to invoke optimizer functions, such as cost and selectivity functions. For example, one level of granularity regarding a predicate may include only the name of an operator or function. Another level of granularity, further includes one or more arguments to the operation or function. Yet another level of granularity further includes the return type of the operation or function. It is noted that other and additional levels of granularities may be used within the scope of the invention.

According to an embodiment of the invention, redundant cost/selectivity functions of varying granularity may be registered for any object on the database system. If multiple cost/selectivity functions of varying granularities are defined for an object, then the optimizer can determine which granularity of cost/selectivity function should be employed based upon system conditions or user instructions. For example, if a predicate involves a function for which the distribution of values renders it likely that an accurate cost/selectivity estimate can be obtained with minimal parameters, then the system can utilize a cost/selectivity function that requires only part of the predicate information to be sent. On the other hand, if the optimizer determines that the predicate involves a function for which only high granularity cost functions can return an accurate estimate, and if the excess costs to transfer the information is deemed less important than a more accurate estimate, then a high granularity cost function will be employed.

The current system and environmental conditions may be considered when determining which cost/selectivity function to employ. For example, during periods of high network usage, the optimizer may determine that the tradeoff between increased accuracy of cost estimate versus increased network overhead weighs in favor of sending less information (thereby incurring less network overhead) and receiving a less accurate estimate of cost.

In an alternate embodiment, only a single level of granularity for cost/selectivity functions may be registered for an object. In this alternate embodiment, the creator of the optimizer object type makes a choice as to the proper granularity and complexity to employ when creating and registering the function. The choice would be based upon the known properties and characteristics of the object to which the functions are directed. The advantage of this approach is that fewer functions need to be created and registered in the system. Moreover, the system does not have to expend any overhead in determining the proper granularity of function to call.

Further details regarding the processing of predicates by an optimizer are disclosed in copending U.S. application Ser. No. [NOT YET ASSIGNED], Attorney Docket No. 238/263, which is hereby incorporated by reference in its entirety.

Hardware Overview

Figure 7:
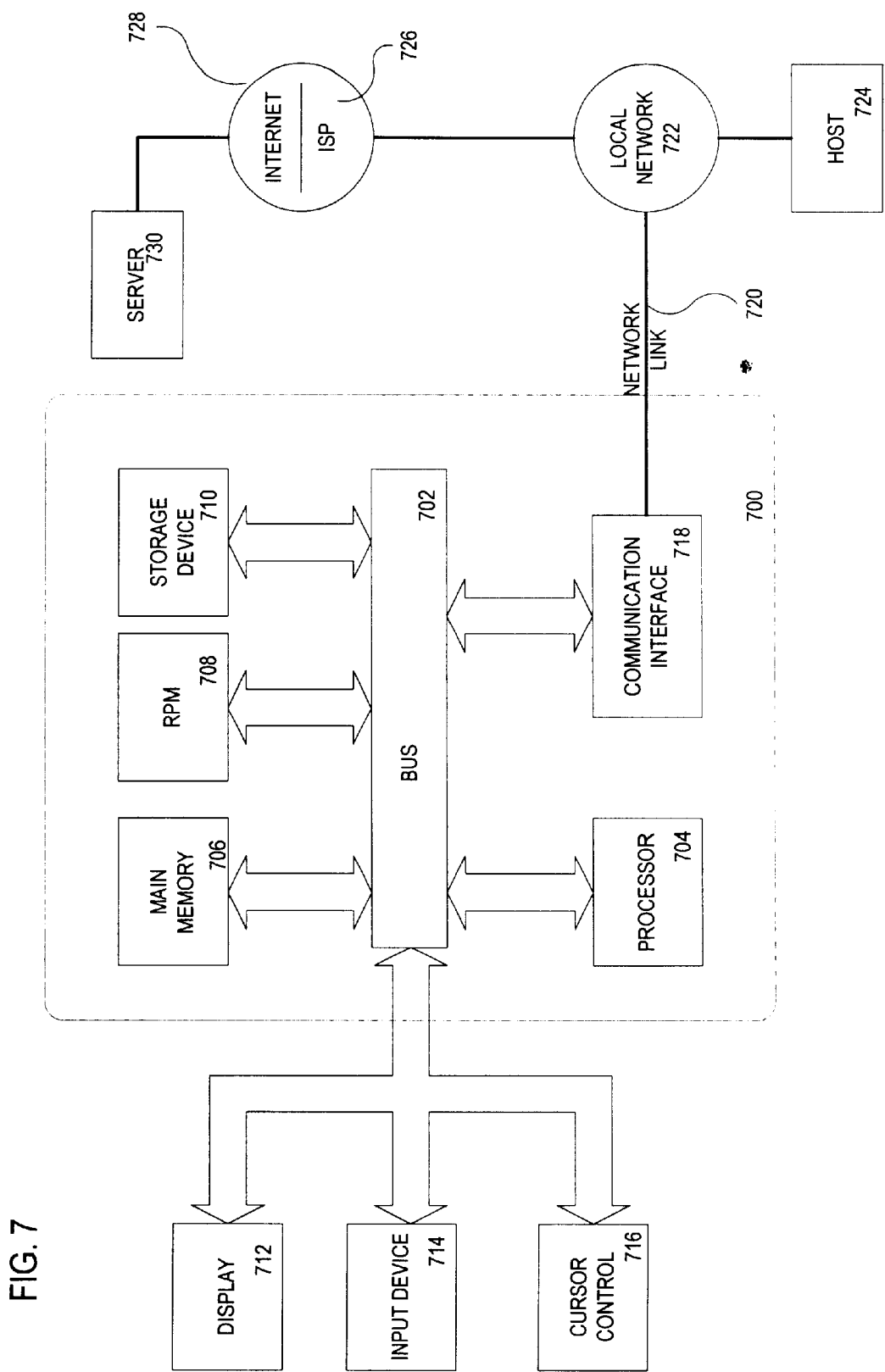
FIG. 7 is a diagram of a computer hardware system with which the present invention can be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for optimization in a database system. According to one embodiment of the invention, such use is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for optimization in a database system.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and that the invention can be performed using different or additional process action, or a different combination or ordering of process actions. The specification and drawings are, accordingly, to be regarded in an illustrative rather than restrictive sense.

What is claimed is:

1. A method of optimizing execution of a database statement, comprising:
   receiving a database statement comprising a predicate;
   submitting a lower bounding value to an optimizer function, said lower bounding value defining a lower boundary of a range of values for said predicate;
   submitting an upper bounding value to said optimizer function, said upper bounding value defining an upper boundary of said range of values for said predicate; and
   using said optimizer function to estimate costs of an execution plan for said database statement, said optimizer function being selected from the group consisting of cost estimation function, selectivity function, and statistics collection function.

2. The method of claim 1 further comprising:
   submitting information to said optimizer function indicating whether said lower bounding value is included in said range of values.

3. The method of claim 1 further comprising:
   submitting information to said optimizer function indicating whether said upper bounding value is included in said range of values.

4. The method of claim 1 in which said optimizer function is a defined optimizer function for non-native objects.

5. The method of claim 1 in which said non-native objects is selected from the group consisting of user-defined index, user-defined index type, user-defined data type, user-defined column, and user-defined package.

6. The method of claim 1 in which said predicate is not a Boolean function.

7. The method of claim 1 in which said predicate is of the form Function( ) Relop Value-Expression.

8. The method of claim 7 in which Relop is selected from <, <=, =, >=, or >.

9. A method of optimizing execution of a database statement comprising:
   receiving a database statement comprising a predicate, wherein the predicate is not a Boolean function;
   submitting one or more range values to an optimizer function corresponding to the predicate;
   determining an execution plan for the database statement based upon the one or more ranges; and
   executing the execution plan.

10. The method of claim 9 in which the one or more range values comprise a lower bounding value for a range.

11. The method of claim 9 in which the one or more range values comprise a higher bounding value for a range.

12. The method of claim 9 in which the one or more range values indicates an inclusion or an exclusion from a range.

13. The method of claim 9 in which said optimizer function is selected from the group consisting of cost estimation function, selectivity function, and statistics collection function.

14. The method of claim 9 in which said predicate is of the form Function( ) Relop Value-Expression.

15. The method of claim 14 in which Relop is selected from <, <=, =, >=, or >.

16. A method of optimizing execution of a database statement, comprising:
   receiving a database statement for execution;
   generating a plurality of possible execution plans to execute said database statement;
   determining a granularity level of information regarding said database statement to use to estimate costs of said plurality of possible execution plans;
   sending said information regarding said database statement at said granularity level to one or more optimizer functions, said one or more optimizer functions being functions selected from the group consisting of statistics functions, selectivity functions, and cost functions; and
   estimating said costs for each of said plurality of possible execution plans.

17. The method of claim 16 in which said granularity level is determined based upon characteristics of one or more database entities accessed by said database statement.

18. The method of claim 16 in which said granularity level is determined based upon system conditions at time of execution of said database statement.

19. The method of claim 18 in which said granularity level is determined when said one or more optimizer functions are created.

20. A computer program product that includes a medium readable by a processor, the medium comprising a sequence of instructions which, when executed by said processor, causes said processor to execute a process to optimize execution of a database statement, said process comprising:
   receiving a database statement comprising a predicate;
   submitting a lower bounding value to an optimizer function, said lower bounding value defining a lower boundary of a range of values for said predicate;
   submitting an upper bounding value to said optimizer function, said upper bounding value defining an upper boundary of said range of values for said predicate; and
   using said optimizer function to estimate costs of an execution plan for said database statement, said optimizer function being selected from the group consisting of cost estimation function, selectivity function, and statistics collection function.

21. The computer program product of claim 20, wherein said process further comprises:
   submitting information to said optimizer function indicating whether said lower bounding value is included in said range of values.

22. The computer program product of claim 20, wherein said process further comprises:
   submitting information to said optimizer function indicating whether said upper bounding value is included in said range of values.

23. The computer program product of claim 20 in which said optimizer function is a defined optimizer function for non-native objects.

24. The computer program product of claim 20 in which said non-native objects is selected from the group consisting of user-defined index, user-defined index type, user-defined data type, user-defined column, and user-defined package.

25. The computer program product of claim 20 in which said predicate is not a Boolean function.

26. A computer program product that includes a medium readable by a processor, the medium comprising a sequence of instructions which, when executed by said processor, causes said processor to execute a process to optimize execution of a database statement, said process comprising:
   receiving a database statement for execution;
   generating a plurality of possible execution plans to execute said database statement;
   determining a granularity level of information regarding said database statement to use to estimate costs of said plurality of possible execution plans;
   sending said information regarding said database statement at said granularity level to one or more optimizer functions, said one or more optimizer functions being functions selected from the group consisting of statistics functions, selectivity functions, and cost functions; and
   estimating said costs for each of said plurality of possible execution plans.

27. The computer program product of claim 26 in which said granularity level is determined based upon characteristics of one or more database entities accessed by said database statement.

28. The computer program product of claim 26 in which said granularity level is determined based upon system conditions at time of execution of said database statement.

29. The computer program product of claim 28 in which said granularity level is determined when said one or more optimizer functions are created.

30. A computer program product that includes a medium readable by a processor, the medium comprising a sequence of instructions which, when executed by said processor, causes said processor to execute a process to optimize execution of a database statement, said process comprising:
   receiving a database statement comprising a predicate, wherein the predicate is not a Boolean function;
   submitting one or more range values to an optimizer function corresponding to the predicate;
   determining an execution plan for the database statement based upon the one or more ranges; and
   executing the execution plan.

31. The computer program product of claim 30 in which the one or more range values comprise a lower bounding value for a range.

32. The computer program product of claim 30 in which the one or more range values comprise a higher bounding value for a range.

33. The computer program product of claim 30 in which the one or more range values indicates an inclusion or an exclusion from a range.

34. The computer program product of claim 30 in which said optimizer function is selected from the group consisting of cost estimation function, selectivity function, and statistics collection function.

35. A system for optimizing execution of a database statement, said system comprising:
   means for receiving a database statement comprising a predicate;
   means for submitting a lower bounding value to an optimizer function, said lower bounding value defining a lower boundary of a range of values for said predicate;

means for submitting an upper bounding value to said optimizer function, said upper bounding value defining an upper boundary of said range of values for said predicate; and means for using said optimizer function to estimate costs of an execution plan for said database statement, said optimizer function being selected from the group consisting of cost estimation function, selectivity function, and statistics collection function.

36. The system of claim 35 wherein said system further comprises:

means for submitting information to said optimizer function indicating whether said lower bounding value is included in said range of values.

37. The system of claim 35, wherein said system further comprises:

means for submitting information to said optimizer function indicating whether said upper bounding value is included in said range of values.

38. The system of claim 35 in which said optimizer function is a defined optimizer function for non-native objects.

39. The system of claim 35 in which said non-native objects is selected from the group consisting of user-defined index, user-defined index type, user-defined data type, user-defined column, and user-defined package.

40. The system of claim 35 in which said predicate is not a Boolean function.

41. A system for optimizing execution of a database statement, said system comprising:

means for receiving a database statement for execution;

means for generating a plurality of possible execution plans to execute said database statement;

means for determining a granularity level of information regarding said database statement to use to estimate costs of said plurality of possible execution plans;

means for sending said information regarding said database statement at said granularity level to one or more optimizer functions, said one or more optimizer functions being functions selected from the group consisting of statistics functions, selectivity functions, and cost functions; and means for estimating said costs for each of said plurality of possible execution plans.

42. The system of claim 41 in which said granularity level is determined based upon characteristics of one or more database entities accessed by said database statement.

43. The system of claim 42 in which said granularity level is determined based upon system conditions at time of execution of said database statement.

44. The system of claim 43 in which said granularity level is determined when said one or more optimizer functions are created.

45. A system for optimizing execution of a database statement, said system comprising:

means for receiving a database statement comprising a predicate, wherein the predicate is not a Boolean function;

means for submitting one or more range values to an optimizer function corresponding to the predicate;

means for determining an execution plan for the database statement based upon the one or more ranges; and means for executing the execution plan.

46. The system of claim 45 in which the one or more range values comprise a lower bounding value for a range.

47. The system of claim 45 in which the one or more range values comprise a higher bounding value for a range.

48. The system of claim 45 in which the one or more range values indicates an inclusion or an exclusion from a range.

49. The system of claim 45 in which said optimizer function is selected from the group consisting of cost estimation function, selectivity function, and statistics collection function.

* * * * *